United States Patent Office 3,393,782
Patented July 23, 1968

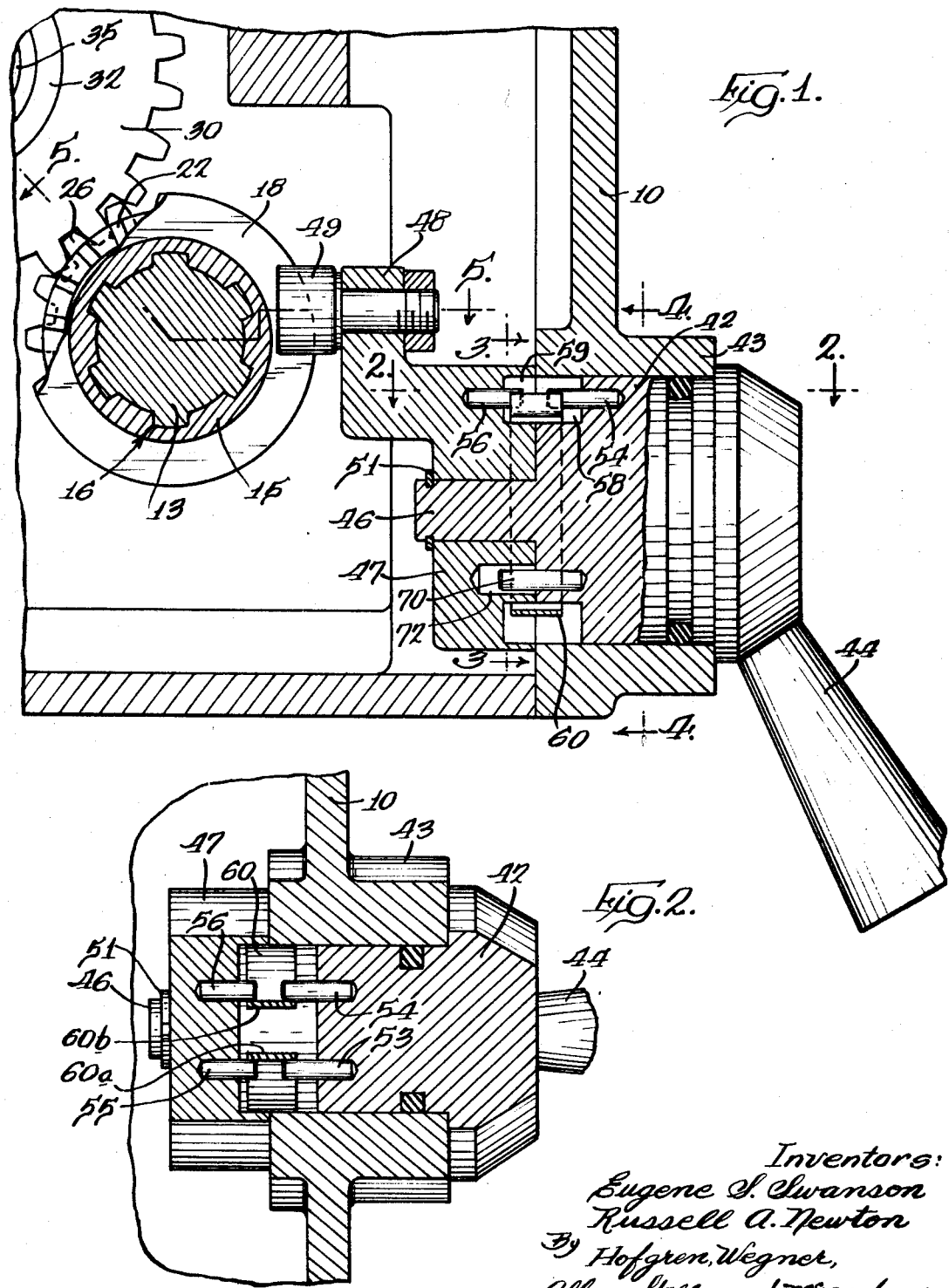

3,393,782
SHIFTER FOR TOOTHED DRIVE MEMBER
Eugene S. Swanson and Russell A. Newton, Rockford, Ill., assignors to Rockford Machine Tool Co., a corporation of Illinois
Filed Jan. 5, 1966, Ser. No. 518,881
12 Claims. (Cl. 192—67)

ABSTRACT OF THE DISCLOSURE

A shifting assembly for a toothed drive member including a manually rotatable actuator connected to drive a rotary shifting member to its engaged position through a flat torsion type spring so that the shifting member may not be forced into engagement, and a lost motion connection between the actuator and the shifting member operable only to disengage the shifting member.

---

This invention relates to a device for shifting a clutch member or the like between a meshing position and a non-meshing position relative to a complementary member. In a preferred embodiment illustrated herein, a clutch member having oppositely projecting clutch teeth at opposite ends is shifted between a neutral central position and opposed extreme positions, but it should be understood that the principles of the invention may also be embodied in a gear shifting device, and there may be more or less positions of the shiftable member.

It is a general object of the invention to provide a new and improved shifter device of the type described.

A more specific object is to provide a new and improved device for shifting a toothed drive member including a shifter adapted to engage the drive element for shifting it, a movable actuator and means providing a yieldable connection between the actuator and the shifter enabling arrest of movement of the drive member toward mesh when it does not mesh with its complementary member.

A further object is to provide a new and improved device of the type described including means providing a positive connection between the actuator and the shifter for moving the shifter in a direction to move the drive member out of mesh.

It is also an object to provide a new and improved device of the character mentioned wherein the positive driving connection embodies lost motion means.

Another object is to provide a device for shifting a clutch member with opposed teeth at opposite ends in opposite directions from a neutral position selectively to meshing positions with complementary clutch members including a rotary shifter having an arm adapted to engage the shiftable clutch member, a coaxial rotary actuator, a yieldable connection between the actuator and the shifter in the form of two pairs of aligned pins on the shifter and actuator respectively carrying opposite ends of a spring adapted to yieldably drive the shifter on movement of the actuator in either direction, and a positive connection between the actuator and shifter including lost motion in the form of a pin on the actuator in an over-size recess in the shifter to positively disengage the clutch member.

Other objects and advantages will become readily apparent from the following detailed description taken in connection with the accompanying drawings, in which:

FIG. 1 is a fragmentary sectional view through a gear box embodying a shifter incorporating the principles of the present invention, the view being taken at approximately the line 1—1 of FIG. 5;

FIG. 2 is a fragmentary sectional view taken at about the line 2—2 illustrated in FIG. 1 and in FIG. 3;

Figure 3:
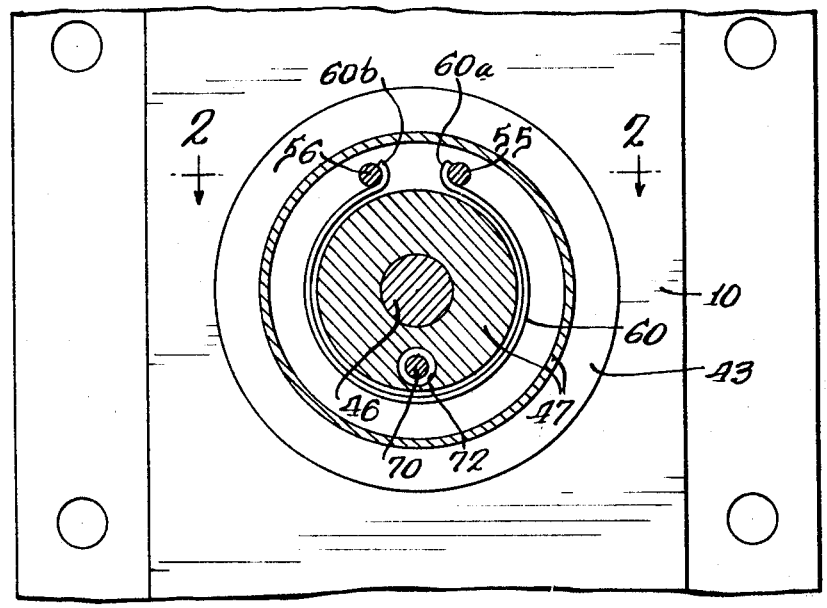
FIG. 3 is a fragmentary sectional view taken at about the line 3—3 of FIG. 1.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Figure 5:
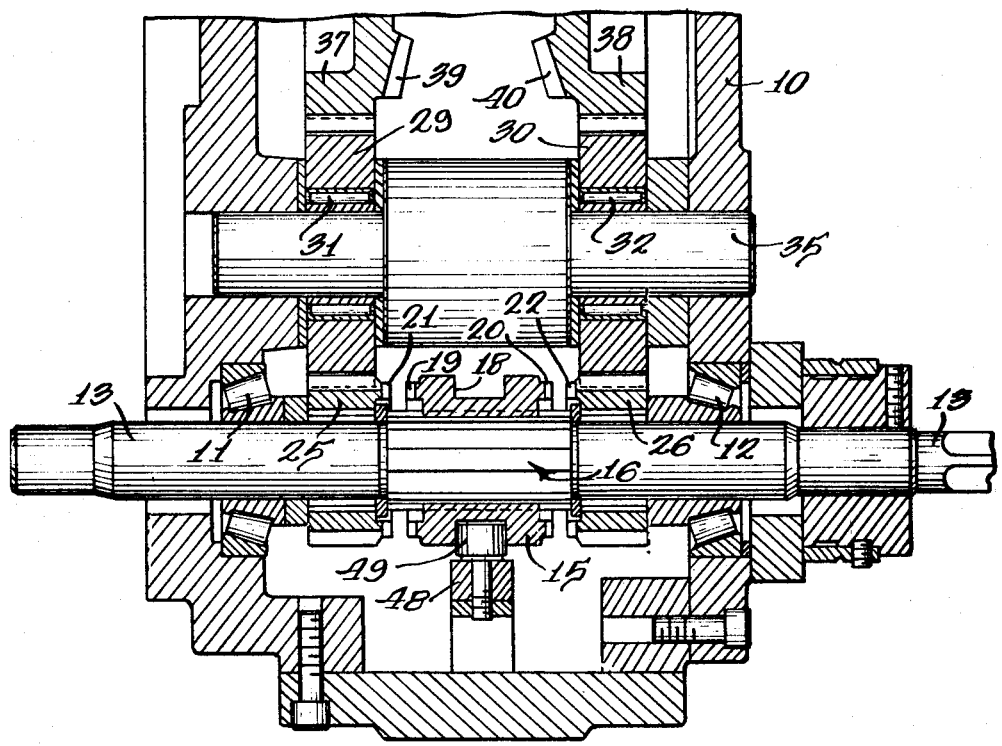
FIG. 5 is an irregular sectional view taken at about the line 5—5 of FIG. 1.

Referring now to the drawings in more detail, and particularly FIGS. 1 and 5, a portion of a gear box is illustrated at 10 and includes bearings as at 11 and 12 for rotatably supporting a shaft 13 adapted to be driven alternately in oposite directions by a shiftable clutch member 15 mounted on the shaft by means of a splined connection 16 which provides for rotation of the shaft and the clutch member together and for slidable movement of the clutch member on the shaft.

The clutch member 15 is in the form of a generally cylindrical member having a centrally located exterior annular groove 18 and having on opposite end faces clutch teeth as at 19 and 20 adapted to mesh respectively with face clutch teeth 21 and 22 on the end faces of gears 25 and 26, both rotatably mounted on shaft 13.

In turn, the teeth on gears 25 and 26 mesh respectively with teeth on gears 29 and 30 rotatably supported as by bearings 31 and 32 on a shaft 35 fixed in the gear housing 10. The teeth on gears 29 and 30 respectively mesh with teeth on gears 37 and 38, and the latter additionally have bevel gear teeth 39 and 40 adapted to mesh with a beveled pinion (not shown) providing a source of power for rotating gears 37 and 38 in opposite directions to alternately drive the shaft 13 in opposite directions depending on whether the shiftable clutch member 15 is moved into mesh with clutch teeth 21 or 22. If desired, the number of gear teeth on the gear members 29, 30, 37 and 38 may be selected so as to provide rotation of the shaft 13 at different speeds.

In order to provide for shifting movement of the shiftable clutch member 15 from the neutral central position illustrated in FIG. 5 in opposite directions to engage either of the gears 25 and 26, a clutch shifting device, best illustrated in its entirety in FIG. 1, includes a rotary actuator in the form of a cylindrical member 42 rotatably supported in a boss 43 on the housing 10. The actuator includes a suitable manually accessible handle as at 44 adapted to facilitate manipulation of the shifting device to selectively engage the clutch member 15 with either the gear member 25 or the gear member 26.

The actuator 42 is formed at its inner end with a coaxial reduced extension 46 on which there is mounted a rotary shifter 47 in the form of a generally cylindrical member having an arm extension 48 carrying a suitable roller 49 disposed in the groove 18 of the shiftable clutch member 15. The shifter 47 is retained against axial movement on the actuator extension 46 by means of a snap ring 51 and is mounted to move rotatably with the actuator 42 or rotatably relative to the actuator 42.

According to the present invention, a yieldable driving connection is provided between the actuator 42 and the shifter 47 for purposes of moving the shifter in opposite directions from neutral toward the meshing positions of the shiftable clutch member when the manually operable actuator is moved in opposite directions from a neutral central position toward its extreme positions. The yieldable drive connection functions to move the teeth of the shiftable clutch member into mesh with the teeth on either adjacent gear member if the teeth on the two members are properly aligned. On the other hand, if the teeth are not aligned so as to permit meshing engagement, the yieldable driving connection allows movement of the actuator to its extreme position while permitting arrest of the movement of the shifter and the shiftable clutch member until such time as relative rotation between the shiftable clutch member and the adjacent gears facilitates meshing engagement of the cooperating teeth.

As illustrated in FIGS. 1, 2 and 3, the yieldable driving connection includes a pair of eccentrically located axially disposed angularly spaced pins 53 and 54 on the actuator 42, and a pair of similar eccentrically located axially disposed angularly spaced pins 55 and 56 on the shifter member respectively aligned with the pins on the actuator member. The pins 53 and 54 are fixed in the actuator 42 and project into an outer annular recess 58 at the inner end of actuator 42. Similarly, the pins 55 and 56 are fixed in the shifter 47 and project into an annular recess 59 in the end of shifter 47. A flat leaf spring member 60 is rolled into generally annular configuration and disposed in the mating recesses 58 and 59 about the common axis of the actuator 42 and shifter 47. Opposite ends of the spring member 60 are turned backwardly, and one end 60a is engaged with aligned pins 53 and 55, while the other end 60b is engaged with aligned pins 54 and 56.

In operation, with reference to FIG. 3, it will be understood that if the actuator member is moved in a clockwise direction, pin 54 on the actuator pulls the spring end 60b while the spring end 60a pulls the pin 55 on the shifter tending to cause movement of the shifter with the actuator. Conversely, if the actuator 42 is moved in a counterclockwise direction, pin 53 on the actuator pulls the spring end 60a and the spring end 60b pulls the pin 56 on the shifter tending to cause movement of the shifter with the actuator. At the same time, if the teeth on the clutch member 15 do not mesh with the adjacent teeth on the appropriate gear, and movement of the shiftable clutch member 15 is therefore arrested, movement of the actuator 42 may continue to its extreme position. Thereafter, when relative rotation between the clutch member 15 and the adjacent gears 25 and 26 permits mesh of the clutch teeth, the spring 60 assures further movement of the shiftable clutch member to proper meshing engagement with the appropriate gear member.

Figure 4:
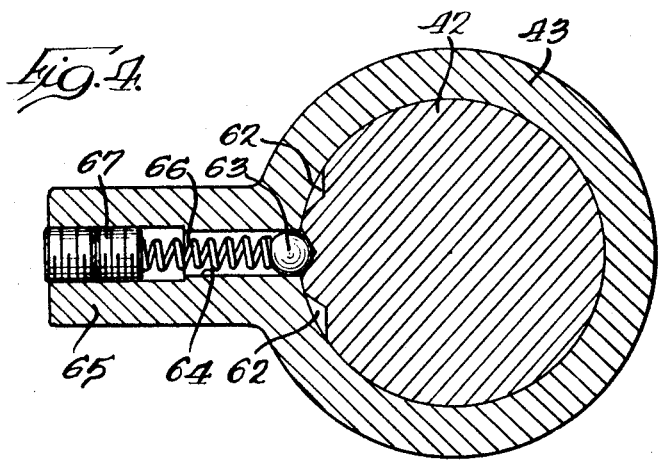
FIG. 4 is a fragmentary sectional view taken at about the line 4—4 of FIG. 1.

In order to retain the actuator 42 in the three operative positions described, and also to retain the shifter in neutral and extreme positions, the periphery of the actuator 42 is provided with angularly spaced detent notches as at 62 (FIG. 4) adapted to cooperate with a spring-biased resiliently yieldable detent member illustrated here in the form of a small detent ball 63. As shown, the ball is housed in a bore 64 in a boss 65 standing outwardly on a boss 43, and the ball is biased toward the actuator 42 by a coiled compression spring 66 housed in bore 64 and retained in position by a suitable plug as at 67.

While it is desirable to provide for yieldable drive of the shifter from the actuator during movement of the two toward a position placing the shiftable clutch member 15 in mesh with one of the adjacent gears, for the purposes described above, it will be understood that at the same time it is desirable to provide for positive disengagement of the shiftable clutch member from the adjacent gear members even though the clutch teeth might be under substantial load sufficient that a mere yieldable drive would not cause disengagement. Accordingly, to this end there is also a positive drive connection between the actuator and the shifter for disengaging clutch member 15, and such positive drive embodies a lost motion means which permits operation of the aforementioned yieldable driving connection.

As seen well in FIGS. 1 and 3, the positive lost motion drive means comprises an eccentrically located axially disposed pin 70 fixed in the actuator 42 and projecting from the inner end thereof into a complementary eccentric axially disposed recess 72 in the end face of shifter 47. The recess 72 has a diameter greater than the diameter of the pin 70 to facilitate motion of the actuator 42 without moving the shifter 47, before positive engagement of the pin 70 with the wall of the recess, positively causes movement of the shifter 47. Thus, upon movement of the acutator 42 from one of its extreme positions toward neutral to disengage clutch member 15, if the load on the engaged clutch teeth is such that the yieldable driving connection does not disengage the teeth, ultimately the pin 70 positively moves the shifter 47 to ensure disengegament, following which the yieldable connection ultimately moves the shifter back into alignment with the actuator. Additionally, it will be understood that upon movement of the actuator 42 in a direction to move the shifter 47 from neutral toward a clutch engaging position, if the clutch teeth on element 15 do not mesh with the clutch teth on the adjacent gear, lost motion movement of the pin 70 in the recess 72 permits movement of the actuator 42 to an extreme position while movement of the shifter is arrested until such time as the clutch teeth mesh.

Figure 6:
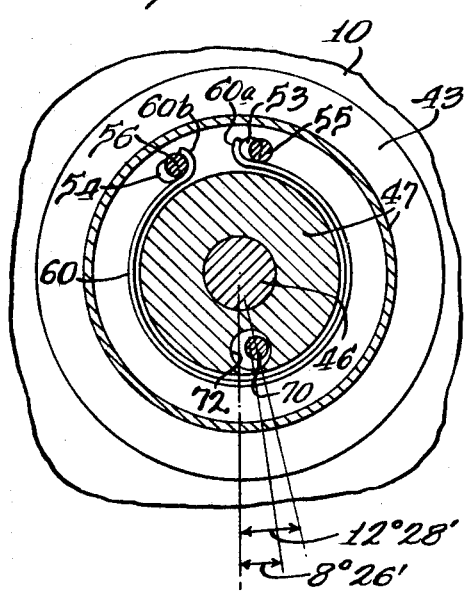
FIGS. 6 and 7 are views similar to FIG. 3 illustrating different operative positions of the parts.
Figure 7:
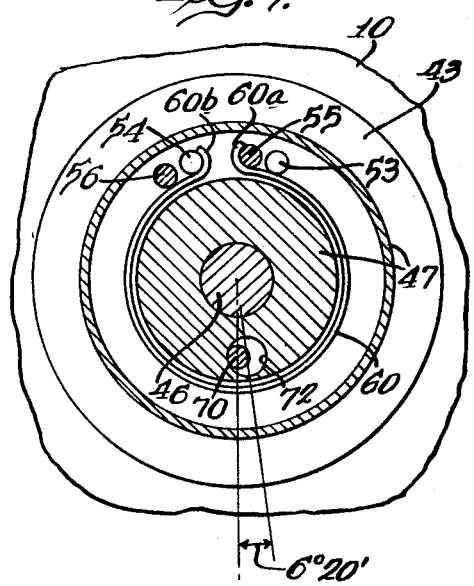

Referring now to FIGS. 6 and 7, for a more explicit showing of the operation, FIG. 6 illustrates the disposition of parts where the actuator 42 and the pins 53, 54 and 70 thereon have been moved from the neutral central position angularly counterclockwise to one extreme position, while movement of the shifter 47 with its pins 55 and 56 and its recess 72 has been arrested because the teeth on the shiftable gear member 15 do not mesh with the teeth on the adjacent gear member. Note that with the parts positioned as illustrated, the pin 70 does not engage the wall of the recess 72. Upon relative rotation of the clutch teeth, so that the clutch teeth may mesh, the shifter will follow the actuator so that the pins 55 and 56 on the shifter become aligned respectively with the pins 53 and 54 on the actuator.

FIG. 7 illustrates the position of parts when the actuator 42, with its pins 53, 54 and 70, have been returned from the extreme position shown in FIG. 6 to the neutral central position, but the shifter 47, with its pins 55 and 56 and recess 72, have been moved only the distance by which the actuator is capable of positively moving the shifter to disengage the clutch teeth under load, the lost motion between the actuator and the shifter having been taken up. Promptly after the parts attain the positions illustrated in FIG. 7, the clutch teeth having been disengaged, the shifter will follow the actuator so that the pins 55 and 56 become aligned respectively with the pins 53 and 54.

Referring to FIG. 6, in a preferred embodiment, it will be noted that the total movement of the actuator and shifter from the neutral central position to one extreme position is 12°28′. The movement of the shifter from the neutral central position toward one extreme position to an intermediate position where nonmeshing clutch teeth engage is 8°26′. Consequently, the angular movement of the shifter required to move the clutch teeth from an engaging non-meshing position to a fully meshing position is 4°02′.

Referring to FIG. 7, it may be noted that the lost motion connection between the actuator and the shifter, provided by pin 70 in recess 72, permits angular movement of the actuator relative to the shifter in an amount of 6°20′. Since the pin 70 can move only 6°20′ in the recess 72 without moving shifter 47, continued movement of pin 70 to the neutral position will move the shifter at least 6°08′, more than the required 4°02′ for positive disengagement of the clutch teeth.

We claim:

1. In a device for shifting a toothed drive member into and out of mesh with a complementary member, in combination, a shifter having a projection adapted to engage a toothed drive member for shifting the latter, means movably mounting the shifter to provide movement of the projection from a first position to an engaged position, an actuator adjacent the shifter, means mounting the actuator for movement from a neutral disengaged position to an engaged position, means holding said actuator in the neutral position, means holding said actuator in the engaged position, means providing a yieldable driving connection between the actuator and the shifter for moving the latter toward the engaged position in response to movement of the former enabling arrest of movement of the drive member toward mesh when it does not mesh, said yieldable driving connection permitting said actuator to move to said engaged position, said yieldable driving connection permitting movement of the actuator to said engaged position with the shifter remaining in a disengaged position, said yieldable driving connection including means responsive to actuator movement toward said neutral position from said engaged position for positively moving said shifter from the engaged position toward the first position.

2. A combination as defined in claim 1, said driving connection including means providing a lost motion positive driving connection between the actuator and the shifter for moving the shifter toward said first position, said yieldable driving connection biasing said shifter to the same predetermined position with respect to said actuator in both said first position and said second position of the shifter.

3. A combination as defined in claim 1, wherein said means providing a yieldable driving connection comprises a spring having opposite ends connected respectively to the actuator and the shifter, said shifter comprising a rotary member having a projecting arm adapted to engage a groove in said drive member, and said actuator comprising a rotary member having a manually accessible handle for operating the actuator.

4. A combination as defined in claim 3 including a frame rotatably supporting the actuator, and means mounting the shifter on the actuator for rotation with and relative to the actuator.

5. In a device for shifting a clutch member with opposed teeth at opposite ends in opposite directions from a neutral central position to extreme positions meshing the opposed teeth respectively with complementary clutch members, in combination, a rotary shifter having an arm projection adapted to engage a groove in a shiftable clutch element for shifting the latter back and forth, a coaxial rotary actuator selectively movable in opposite directions from a neutral central position to opposite extreme positions, and means providing a yieldable drive connection between the actuator and the shifter for moving the shifter in response to movement of the actuator, said means providing a yieldable drive connection comprising a pair of eccentrically located axially disposed pins angularly spaced on said actuator, a pair of eccentrically located axially disposed pins angularly spaced on said shifter and aligned respectively with the pins on said actuator when the actuator and shifter are in neutral positions, and a flat leaf spring member rolled into annular configuration about the common axis of the actuator and shifter and having one end bent around one pair of aligned pins on the shifter and actuator and the other end bent around the other pair of aligned pins on the shifter and actuator, so that on movement of the actuator in either direction from neutral, the actuator tends to drive the shifter and the shifter movement may be arrested on contact of teeth on the shiftable clutch member with non-meshing teeth on the complementary clutch member even though the actuator is moved to an extreme position, and the teeth on the clutch members may later mesh upon rotation of one relative to the other.

6. A combination as defined in claim 5 including means providing a positive drive connection between the actuator and shifter including lost motion means for positively moving the shifter in a direction from one extreme position toward neutral a sufficient distance to positively disengage clutch teeth, said means providing a positive drive connection comprising an eccentrically located axially disposed pin on the actuator, and means providing an eccentrically located axially disposed recess in the shifter receiving said last recited pin and having an area greater than the area of the pin to provide a lost motion connection for positively moving the shifter toward neutral.

7. A combination as defined in claim 6, including means cooperating with the actuator releasably retaining the latter in neutral and extreme positions.

8. A combination as defined in claim 6, wherein the radial length of said projection from said common axis is greater than the eccentricity of said last recited pin so that limited movement of the pin in an angular direction after contact of the pin with the recess wall produces greater movement of the projection.

9. A combination as defined in claim 6, wherein the angular lost motion permitted between the actuator and the shifter is less than the angular movement of the shifter to engage teeth on the shiftable clutch member with non-meshing teeth on a complementary member, so that the positive movement of the shifter by the actuator is more than the movement of the shiftable clutch member between full mesh and contacting non-mesh positions.

10. In a device for shifting a toothed drive member into and out of mesh with a complementary member, in combination, a shifter having a projection adapted to engage a toothed drive member for shifting the latter, means movably mounting the shifter to provide movement of the projection back and forth, an actuator adjacent the shifter, means mounting the actuator for movement back and forth, means providing a yieldable driving connection between the actuator and the shifter for moving the latter in response to movement of the former and enabling arrest of movement of the drive member toward mesh when it does not mesh, including means providing a positive driving connection between the actuator and the shifter for moving the shifter in a direction to move a drive member out of mesh, said shifter comprising a rotary member having a projecting arm adapted to engage a groove in said drive member, said actuator comprising a rotary member having a manually accessible handle for operating the actuator, said means providing a yieldable driving connection comprising an eccentrically located pin on the actuator, an eccentrically located pin on the shifter, and a flat leaf spring member rolled into part circular configuration and having opposite ends connected respectively to said pins.

11. In a device for shifting a toothed drive member into and out of mesh with a complementary member, in combination, a shifter having a projection adapted to engage a toothed drive member for shifting the latter, means movably mounting the shifter to provide movement of the projection back and forth, an actuator adjacent the shifter, means mounting the actuator for movement back and forth, means providing a yieldable driving connection between the actuator and the shifter for moving the latter in response to movement of the former and enabling arrest of movement of the drive member toward mesh when it does not mesh, including means providing a positive driving connection between the actuator and the shifter for moving the shifter in a direction to move a drive member out of mesh, said shifter comprising a rotary member having a projecting arm adapted to engage a groove in said drive member, said actuator comprising a rotary member having a manually accessible handle for operating the actuator, said means providing a positive driving connection comprising an eccentrically located pin on the actuator, and means providing an eccentrically located recess in the shifter receiving said pin and having an area greater than the area of the pin to provide a positive lost motion connection.

12. A shifting assembly for a movable drive member comprising: a shifting member movable from a neutral first predetermined disengaged position to an engaged unmeshed second predetermined position and from said second position to a fully meshed third position, an actuator movable between a neutral first position to a predetermined second position for moving said shifting member from said first position to said second engaged position and said third position, means holding said actuator in its first position, means holding said actuator in its second position, resilient biasing means for urging said shifting member to its neutral first disengaged position with said actuator in its neutral first position, said biasing means urging said shifting member to its meshed third position when said actuator is in its second position, and means responsive to movement of said actuator from said second position toward said first position for positively moving said shifting member from said third engaged position toward said first position, said means for positively moving said shifting member permitting sufficient relative movement between the shifter and the actuator so that said actuator may move to its second position when the shifter remains in its second position so that the shifter is not positively moved from its second to its third position and preventing sufficient relative movement between the shifter and the actuator for the actuator to move from its second position to its neutral position with the shifter remaining in its third position so that the shifter is positively moved from its third position when the actuator is moved from its second position to its neutral position.

References Cited

UNITED STATES PATENTS

| | | | |
|---|---|---|---|
| 486,687 | 11/1892 | Swarthout | 74—470 X |
| 1,082,551 | 12/1913 | Pfeiffer | 192—67 X |
| 1,157,001 | 10/1915 | Howard | 192—109 X |
| 1,177,133 | 3/1916 | Parker | 192—109 X |
| 1,304,955 | 5/1919 | Fowler | 192—99 X |
| 1,898,190 | 2/1933 | Kohler | 192—67 |

FOREIGN PATENTS

| | | |
|---|---|---|
| 828,681 | 2/1938 | France. |

BENJAMIN W. WYCHE III, *Primary Examiner.*